(12) United States Patent
Drepper

(10) Patent No.: US 10,983,847 B2
(45) Date of Patent: Apr. 20, 2021

(54) DYNAMICALLY LOADABLE UNIKERNEL BINARIES

(71) Applicant: Red Hat, Inc., Raleigh, NC (US)

(72) Inventor: Ulrich Drepper, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 80 days.

(21) Appl. No.: 16/277,641

(22) Filed: Feb. 15, 2019

(65) Prior Publication Data
US 2020/0264941 A1 Aug. 20, 2020

(51) Int. Cl.
| | |
|---|---|
| G06F 9/54 | (2006.01) |
| G06F 9/50 | (2006.01) |
| G06F 16/907 | (2019.01) |
| G06F 21/62 | (2013.01) |
| G06F 9/455 | (2018.01) |

(52) U.S. Cl.
CPC .......... *G06F 9/545* (2013.01); *G06F 9/45533* (2013.01); *G06F 9/5044* (2013.01); *G06F 9/544* (2013.01); *G06F 16/907* (2019.01); *G06F 21/629* (2013.01)

(58) Field of Classification Search
CPC ............. G06F 9/45558; G06F 9/45533; G06F 9/5077; G06F 16/183; G06F 9/545; G06F 9/5044; G06F 16/907; G06F 21/629; G06F 9/544
See application file for complete search history.

(56) References Cited

U.S. PATENT DOCUMENTS

| | | | |
|---|---|---|---|
| 9,886,303 B2 | 2/2018 | Koller Jemio et al. | |
| 2017/0155724 A1 | 6/2017 | Haddad et al. | |
| 2018/0046446 A1* | 2/2018 | Turovsky | G06F 8/71 |
| 2020/0183726 A1* | 6/2020 | Heindl | H04L 63/0272 |

OTHER PUBLICATIONS

Vittorio Cozzolino; FADES: Fine-Grained Edge Offloading with Unikernels; ACM 2017 (Year: 2017).*
Stefan Lankes; HermitCore—A Unikernel for Extreme Scale Computing; ROSS '16, Jun. 1, 2016 (Year: 2016).*
Anil Madhavapeedy; Jitsu: Just-In-Time Summoning of Unikernels; May 4-6, 2015; (Year: 2015).*
Williams et al., "Unikemels as Processes", In Proceedings of SoCC '18: ACM Symposium on Cloud Computing, Oct. 11-13, 2018, 13 pages.
Sfyrakis et al, "VirtusCap: Capability-based Access Control for Unikernels", IEEE International Conference on Cloud Engineering, 2017, 12 pages.

* cited by examiner

*Primary Examiner* — Dong U Kim
(74) *Attorney, Agent, or Firm* — Lowenstein Sandler LLP

(57) ABSTRACT

A method of launching a unikernel comprises: identifying, by a kernel utilizing a set of system resources of a computing system, a unikernel to be launched in an exclusive mode; determining that the set of system resources of the computing system satisfies hardware requirements specified by configuration metadata of the unikernel; releasing, by the kernel, the set of system resources for use by the unikernel; launching the unikernel; and terminating the kernel.

19 Claims, 10 Drawing Sheets

DYNAMICALLY LOADABLE UNIKERNEL BINARIES

TECHNICAL FIELD

The present disclosure is generally related to a computing environment, and more particularly, to dynamically launching unikernel binaries using system resources allocated by the operating system (OS) kernel.

BACKGROUND

User space applications typically access the system resources by making calls to the OS kernel, since the system resources are typically managed by the kernel. Additionally, a typical kernel may include certain functionality which is not needed by at least some of the processes which may be running at any given time. Accessing the system resources via system calls may result in latencies and unnecessary processing being done, which may be unacceptable for applications which need to use all the system resources themselves or are sensitive to the delays brought onto them by unrelated activity in the system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
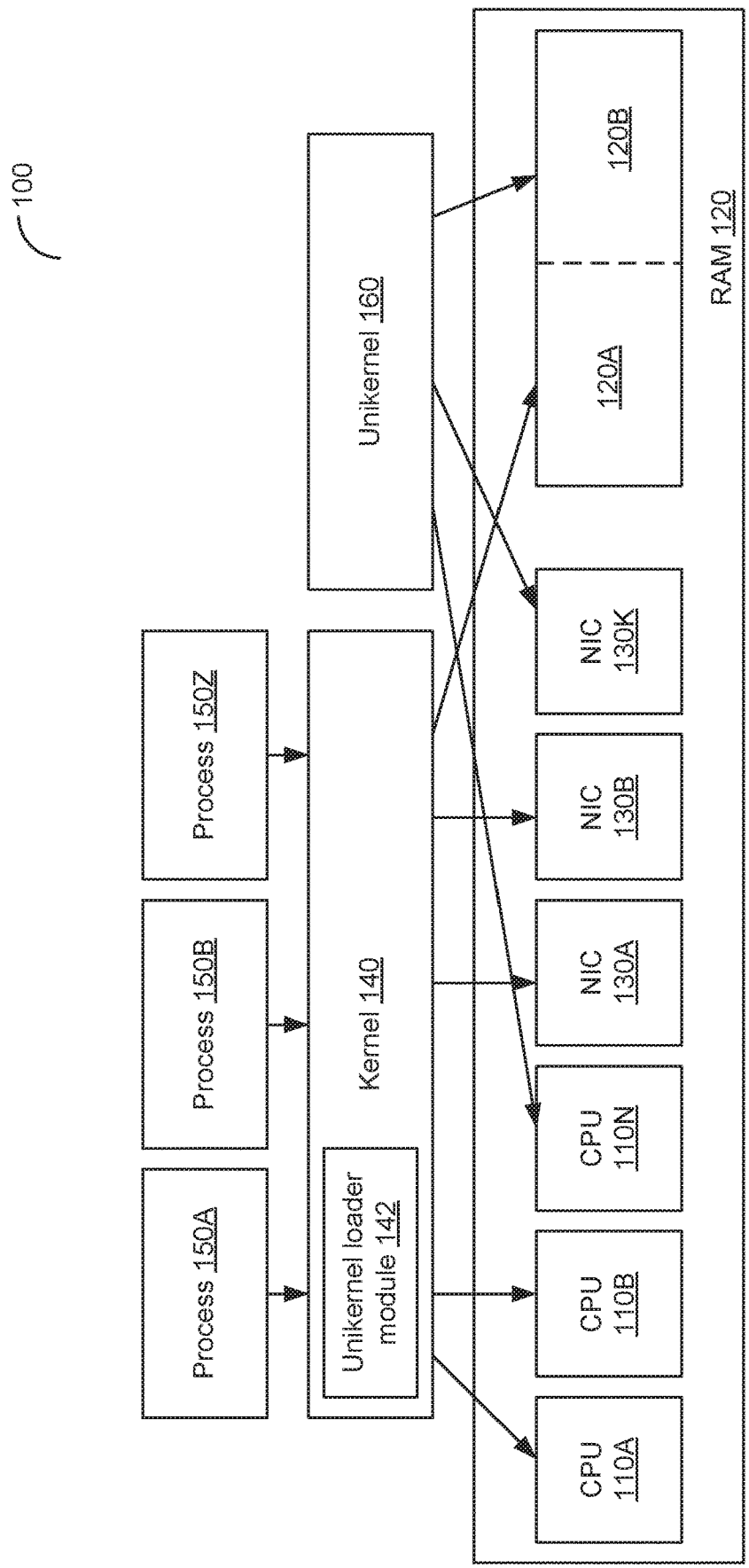
FIG. 1 schematically illustrates an example computing system running a unikernel in the non-exclusive execution mode, in accordance with one or more aspects of the present disclosure.

Described herein are methods and systems for dynamically launching unikernel binaries using system resources allocated by the operating system (OS) kernel for exclusive use of the unikernel.

User space applications, which usually do not have direct control over the system resources of a computing system, interface with the system resources via the OS kernel. "System resources" herein refer to processing cores, memory, and/or input/output (I/O) devices (e.g., network interface controllers). The user space to kernel space mode transitions, which are inevitable for user space applications, often lead to latencies which are unacceptable for high-performance computing (HPC) and real-time applications. Furthermore, since the OS kernel has full control over the system resources, it can at any time re-allocate at least some of the resources that have been previously allocated to a user space application, thus further increasing the processing latency in the user space application.

The application efficiency may be improved by combining the application and kernel functionality in a single software module, which is referred herein as "unikernel," which is capable of directly accessing and/or controlling the system resources. In certain implementations, a unikernel is deployed by booting the computing system using the unikernel image. Thus, every unikernel launch would require the system reboot.

Furthermore, the computing system running a unikernel may not be employed to running any other applications, thus necessarily rendering idle any system resources that are not utilized by the running unikernel. Conversely, as the capacity of physical machines grows, so too does the complexity of creating a unikernel to leverage all available system resources. For example, a modern computing system may have hundreds of processing cores, the full utilization of which would require a unikernel application which simultaneously runs hundreds of execution threads.

The present disclosure addresses these and other deficiencies of various common implementations by providing methods and systems for dynamically launching unikernel binaries using system resources allocated by the OS kernel for exclusive use of the unikernel. In an illustrative example, a computing system may initially be booted normally using a standard or customized kernel, which may then employ a unikernel loader running in the kernel space to launch the unikernel in the exclusive or non-exclusive execution mode. In the exclusive execution mode, the unikernel loader may identify a unikernel to be launched, load the identified unikernel binary into the memory and inspect the configuration metadata of the unikernel binary. Should the system resources of the computing system on which the unikernel loader runs be found sufficient to satisfy the unikernel system resource requirements specified by the configuration metadata, the unikernel loader may proceed with loading the unikernel, releasing all system resources that have been controlled by the kernel, and instructing a processing core to execute a jump instruction to the memory address corresponding to the unikernel entry point, thus initiating execution of the unikernel.

Since the unikernel running in the exclusive execution mode, once loaded, takes over all system resources, it would thus run indefinitely or until the computing system is rebooted. The exclusive execution mode may suit well for HPC applications, which are usually resource-intensive. On the other hand, system and methods of the present disclosure allow for flexibility in the unikernel management: once the computing system is booted using a standard or customized kernel, the unikernel for execution may be selected at runtime and launched without requiring the system re-configuration or reboot. In certain implementations, at least some hardware initialization performed by the OS kernel can survive the unikernel launch thus relieving the unikernel from repeating those hardware initialization operations.

Conversely, in the non-exclusive unikernel execution mode the kernel remains active and thus retains at least some control over the computing system after launching one or more unikernels. Thus, the non-exclusive unikernel execution mode allows for launching another unikernel after the first launched unikernel terminates, and further allows simultaneous execution of two or more unikernels. In the non-exclusive unikernel execution mode, the unikernel loader may identify a unikernel to be launched, load the identified unikernel binary into the memory and inspect the configuration metadata of the unikernel binary. Should the system resources of the computing system on which the unikernel loader runs be found sufficient to satisfy the unikernel system resource requirements specified by the configuration metadata, the unikernel loader may proceed with configuring various system data structures (such as PCI BIOS tables, ACPI tables, etc.) for the unikernel to discover the hardware configuration, loading the unikernel, releasing the system resources that have been allocated to the unikernel, and instructing a processing core allocated to the unikernel to execute a jump instruction to the memory address corresponding to the unikernel entry point, thus initiating execution of the unikernel. The unikernel loader may, in similar fashion, launch another unikernel which would be executed by the computing system in parallel with the first unikernel.

A running unikernel may notify the OS kernel (e.g., via an inter-processor interrupt) of the unikernel's impending termination, thus allowing the OS kernel to resume control over the system resources that were previously allocated to the unikernel. The OS kernel would then be able to allocate these system resources and launch another unikernel, as described in more detail herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically illustrates an example computing system 100 operating in accordance with one or more aspects of the present disclosure. The computing system 100, which may include various system resources, such as processing cores (also referred to as "central processing units," or "CPU") 110A-10N, the memory 120, and peripheral devices, such as network interface controllers (NIC) 130A-130K. In various implementations, the computing system 100 may further include various other components, which are omitted from FIG. 1 for clarity and conciseness. In various illustrative examples, the computing system 100 may be represented by a single computing machine or multiple computing machines arranged in a homogeneous or heterogeneous group (e.g., cluster, grid, or a server farm). Accordingly, the computing system 100 may include one or more rack mounted servers, workstations, desktop computers, notebook computers, tablet computers, mobile phones, palm-sized computing devices, personal digital assistants (PDAs), etc.

The computing system 100 may run multiple processes (applications) 150A-150Z managed by the kernel 140. When the host computing system 102A is rebooted or powered up, the kernel 140 is loaded into the memory 120 by the bootstrap process and one of the processing cores 110A-110N executes a jump instruction to the entry point of the kernel, thus initiating execution of the kernel. The kernel may discover the available system resources, load and initialize physical device drivers, and perform various other tasks, including resource management (e.g., memory management and physical device management) and process management (e.g., controlling execution of applications 150A-150Z).

As schematically illustrated by FIG. 1, the computing system 100 may be employed for running one or more unikernels 160 in the non-exclusive execution mode, in which the kernel 140 remains active and thus retains at least some control over the computing system 100 after launching one or more unikernels 160. In particular, the kernel 140 may allocate to the unikernel 160 the system resources including the processing core 110N, the NIC 130K, and the RAM section 120B, while retaining control over the processing cores 110A-110B, the NICs 130A-130B, and the RAM section 120A. The RAM sections 120A and 120B are non-overlapping, thus the unikernel 160 receives the full control over the RAM section 120B, while the kernel 140 retains the full control over the RAM section 120A. Furthermore, the unikernel 160 receives the full control over the processing core 110N (as shown in FIG. 1 by the arrow connecting the unikernel 160 and the processing core 110N; lack of arrow connecting the processing core 110N to the kernel 140 indicates that the kernel 140 retains no control over the processing core 110N), while the kernel 140 retains the full control over the processing cores 110A-110B.

Thus, the non-exclusive unikernel execution mode allows for launching another unikernel after the first launched unikernel terminates, and further allows simultaneous execution of two or more unikernels.

The unikernel loader (which may be implemented as a kernel-level module 142) may identify a unikernel 160 to be launched and the unikernel execution mode (e.g., exclusive or non-exclusive execution mode). The unikernel to be launched and the execution mode may be specified, e.g., via an administrative user interface in communication with the unikernel loader 142, via an application programming interface (API) exposed by the kernel loader 142, via a parameter passed to the unikernel loader 142 by a script which is executed by the bootstrap process, or via an initialization parameter passed to the kernel 160 by the bootstrap process. The unikernel loader 142 may then load the identified unikernel binary 160 into the memory 120 and inspect the configuration metadata of the unikernel binary 160, as described in more detail herein below with reference to FIG. 6.

The unikernel configuration metadata may specify the system resource requirements, such as the number and type of processing cores, the amount of memory, the number of NICs, and/or various parameters of other system resources to be utilized by the unikernel 160. In certain implementations, the unikernel configuration metadata may specify mandatory system resource requirements and optional system resource requirements.

Should the available system resources of the computing system 100 be insufficient to satisfy the mandatory unikernel system resource requirements specified by the configuration metadata, the unikernel loader 142 may return a corresponding error code and terminate. Otherwise, should the available system resources of the computing system 100 be found sufficient to satisfy the mandatory unikernel system resource requirements specified by the configuration metadata, the unikernel loader 142 may allocate a subset of the system resources of the computing system 100 for the exclusive use of the unikernel 160 and configure various system data structures (e.g., PCI BIOS tables, ACPI tables, etc.) for the unikernel to discover the hardware configuration upon startup (i.e., the allocated system resources). The system configuration tables may reflect the memory configuration, the I/O devices, the Peripheral Component Interconnect (PCI) bus configuration, etc. In certain implementations, the system configuration tables may also reflect the current values of configuration parameters of the hardware devices exposed to a particular unikernel or a virtual domain, the hardware device orderings and/or priorities, etc.

As noted herein above, the kernel 140 may allocate to the unikernel 160 the system resources including the processing core 110N, the NIC 130K, and the RAM section 120B, while retaining control over the processing cores 110A-110B, the NICs 130A-130B, and the RAM section 120A.

The unikernel loader 142 may then release the system resources that have been allocated to the unikernel (including the processing core 110N, the NIC 130K, and the RAM section 120B), relocate the unikernel executable to the RAM section 120B, and instruct the processing core 110N allocated to the unikernel 160 to execute a jump instruction to the memory address corresponding to the unikernel entry point, thus initiating execution of the unikernel 160.

Upon startup, the unikernel 160 would inspect the system data structures (e.g., the PCI BIOS tables and/or ACPI tables) in order to discover the available system resources. In certain implementations, the unikernel 160 may compare the available resources with the resource requirements specified by the unkernel configuration metadata. Should the available system resources be insufficient to satisfy the system resource requirements, the unikernel 160 may terminate. Otherwise, the unikernel 160 may load and initialize physical device drivers, perform various other initialization tasks (such as allocating necessary memory buffers), and continue to run while having the full control over the allocated system resources.

Eventually, the running unikernel 160 may notify the kernel 140 (e.g., via an inter-processor interrupt) of the unikernel's impending termination, thus allowing the kernel 140 to resume the full control over the system resources that were previously allocated to the unikernel 160 (including the processing core 110N, the NIC 130K, and the RAM section 120B). The kernel 140 would then be able to allocate these system resources and launch another unikernel.

Figure 2:
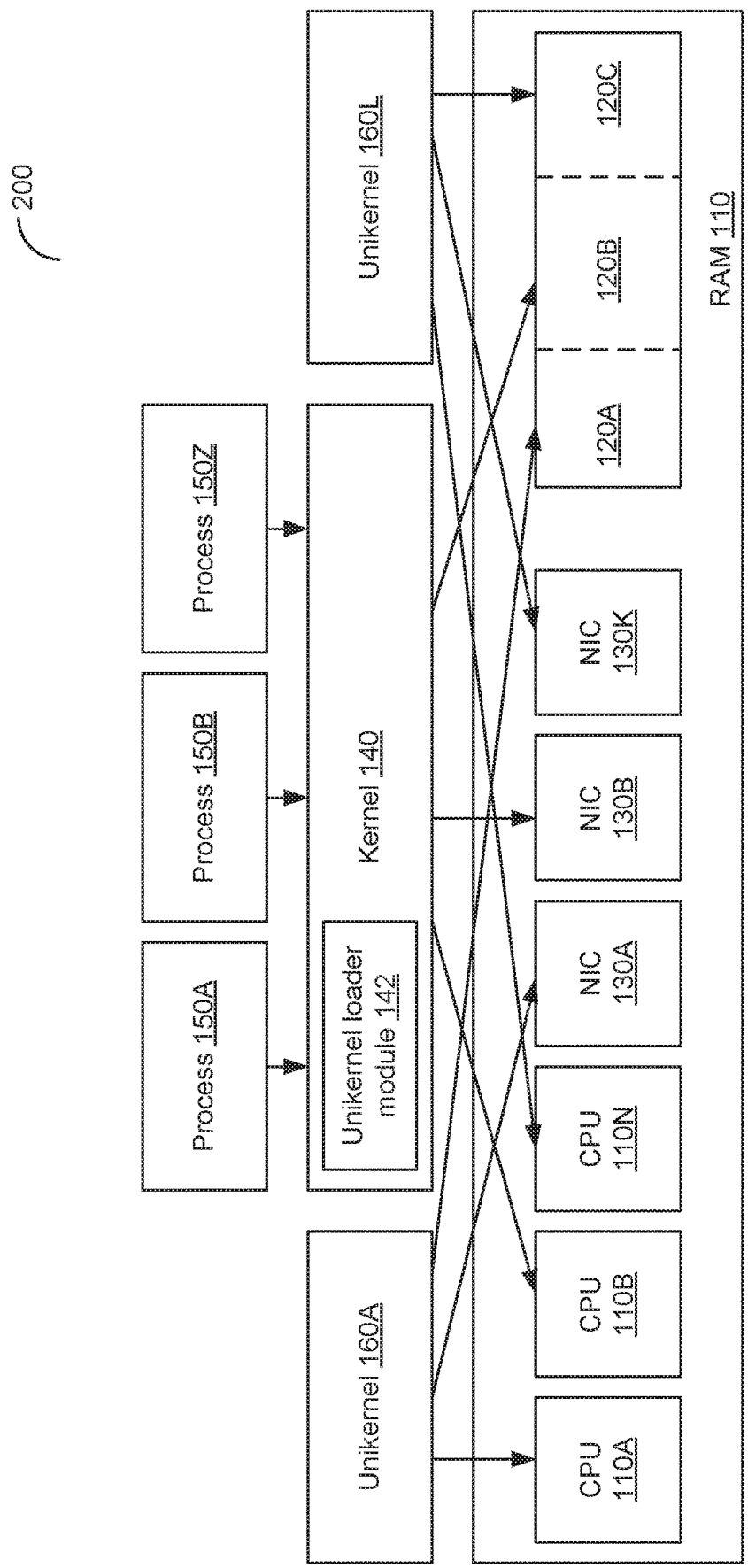
FIG. 2 schematically illustrates another example computing system running two or more unikernels in the non-exclusive execution mode, in accordance with one or more aspects of the present disclosure.

While FIG. 1 illustrates one running unikernel 160, in various other implementations, the unikernel loader 142 may, in similar fashion, launch other unikernels which would be executed by the computing system 100 in parallel with the first unikernel 160. As schematically illustrated by FIG. 2, the computing system 200 may run multiple processes (applications) 150A-150Z managed by the kernel 140 and may further run multiple unikernels 160A-160L in the non-exclusive execution mode, in which the kernel 140 remains active and thus retains at least some control over the computing system 100 after launching the unikernels 160A-160L. In the illustrative example of FIG. 1, the kernel 140 retains control over the processing core 110B, NIC 130B, and the memory section 120B. A set of system resources, including the processing core 110A, NIC 130A, and the memory section 120A is allocated to the unikernel 160A, while another set of system resources, including the processing core 110C, NIC 130C, and the memory section 120C is allocated to the unikernel 160L. Similarly to the example of FIG. 1, the running unikernel 160 may notify the kernel 140 (e.g., via an inter-processor interrupt) of the unikernel's impending termination, thus allowing the kernel 140 to resume the full control over the system resources that were previously allocated to the unikernel 160. The kernel 140 would then be able to allocate these system resources and launch another unikernel 160.

Figure 3:
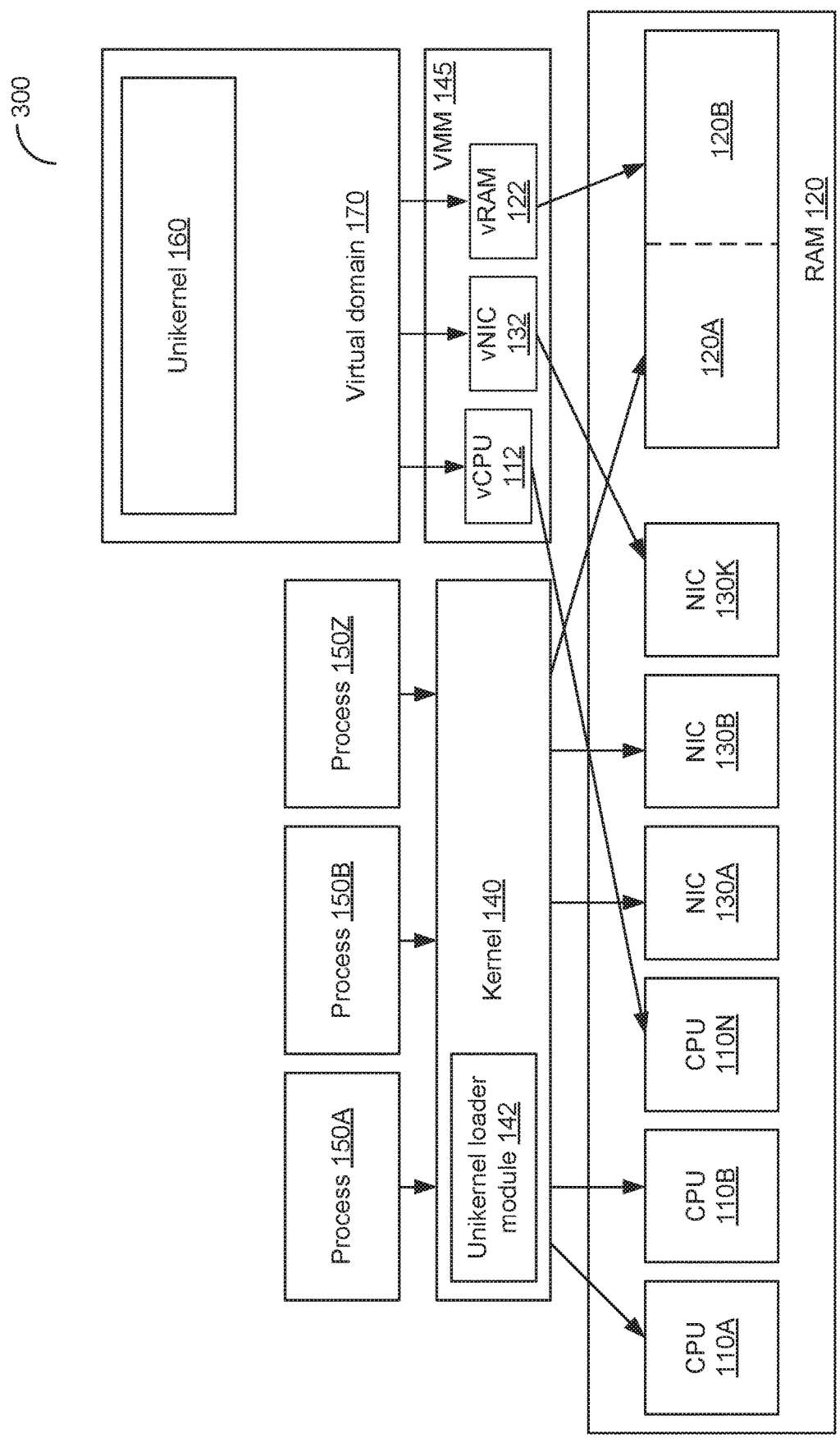
FIG. 3 schematically illustrates another example computing system running a unikernel in a virtual domain, in accordance with one or more aspects of the present disclosure.

In certain implementations, a unikernel 160 running in the non-exclusive mode may run in a virtual domain 170 managed by the virtual machine manager 145 running on the computing system 300, as schematically illustrated by FIG. 3. While in the illustrative example of FIG. 3 the VMM 145 is shown as a standalone software module, in other implementations, the VMM 145 may be a part of the kernel 140.

"Virtualization" herein shall refer to abstraction of hardware components into logical objects in order to allow a computer system to execute various software modules, for example, multiple unikernels, concurrently and in isolation from other software modules. Virtualization may be achieved by running a software layer, often referred to as a "virtual machine monitor" or "hypervisor," above the hardware and below the virtual machines (also referred to as "virtual domains"). A hypervisor may abstract the physical layer and present this abstraction to virtual domains to use, by providing interfaces between the underlying hardware and virtual devices of virtual domains.

Certain processor architectures provide hardware support for virtualization by implementing special instructions for facilitating virtual domain execution. In certain implementations, a processor may support executing, at an elevated privilege level, a VMM that controls the host and has full control of the processor and other platform hardware. The VMM presents a virtual domain with abstractions of one or more processors and other system resources. The VMM is able to retain selective control of processor resources, physical memory, interrupt management, and input/output (I/O).

Using the hardware virtualization mode effectively allows limiting the hardware resources which may be accessed by a unikernel running in a virtual domain. In the above-described illustrative examples of FIGS. 1-2 which do not employ virtualization, the unikernel is advised (e.g., by various system data structures, such as PCI BIOS tables, ACPI tables, etc.) of the system resources allocated to it, nothing would prevent the unikernel from accessing other hardware resources on the system. Conversely, in the virtualized mode, the separation of resources would be enforced by the hardware virtualization, thus only allowing the unikernel to access the system resources that have been allocated to it.

Thus, upon identifying a unikernel 160 to be launched, the unikernel loader module 142 may load the identified unikernel binary 160 into the memory 120 and inspect the configuration metadata of the unikernel binary 160 in order to identify the system resource requirements, such as the number and type of processing cores, the amount of memory, the number of NICs, and/or various parameters of other system resources to be utilized by the unikernel 160.

Should the available system resources of the computing system 100 be found sufficient to satisfy the mandatory unikernel system resource requirements specified by the configuration metadata, the unikernel loader 142 may instruct the VMM 145 to create a virtual domain 170, allocate a set of system resources to the newly created virtual domain, and run the unikernel 160 in the virtual domain. In certain implementations, the virtual domain 170 may be a lightweight virtual domain which is created by initializing only the data structures needed by the processor in order to implement the hardware-assisted virtualization.

In the illustrative example of FIG. 3, the kernel 140 may allocate to the unikernel 160 running in the virtual domain 170 the system resources including the processing core 110N, the NIC 130K, and the RAM section 120B (in which the unikernel binary should be fully contained), while retaining control over the processing core 110A, the NIC 130A, and the RAM section 120A.

The VMM 145 may create various virtual system resources, including the virtual processor (vCPU) 112, the virtual NIC (vNIC) 132, and the virtual memory (vRAM) 122. In certain implementations, the VMM 145 may support SR-IOV specification allowing share a single physical device by two or more virtual machines.

SR-IOV specification enables a single root function (for example, a single Ethernet PHY) to appear to virtual machines as multiple physical devices. A physical I/O device with SR-IOV capabilities may be configured to appear in the PCI configuration space as multiple functions. SR-IOV specification supports physical functions and virtual functions. Physical functions are full PCIe devices that may be discovered, managed, and configured as normal PCI devices. Physical functions configure and manage the SR-IOV functionality by assigning virtual functions. Virtual functions are simple PCIe functions that only process I/O. Each virtual function is derived from a corresponding physical function. The number of virtual functions that may be supported by a given device may be limited by the device hardware. In an illustrative example, a single Ethernet physical transceiver (PHY) may be mapped to multiple virtual functions that can be shared by one or more virtual machines. The VMM 145 may assign one or more virtual functions to a virtual domain, by mapping the configuration space of each virtual function to the guest memory address range associated with the virtual domain.

The VMM 145 may associate the created virtual resources with the newly created virtual domain 170, e.g., by configuring various system data structures (such as PCI BIOS tables and/or ACPI tables) of the virtual domain with identifiers of the newly created virtual resources. VMM 145 may then instruct a processing core allocated to the virtual domain to execute a jump instruction to the memory address corresponding to the unikernel entry point, thus initiating execution of the unikernel 160. Upon startup, the unikernel 160 would inspect the system data structures (e.g., the PCI BIOS tables and/or ACPI tables) in order to discover the available system resources.

Similarly to the example of FIG. 1, the running unikernel 160 may eventually notify the VMM 145 (e.g., via an inter-processor interrupt) of the unikernel's impending termination, thus allowing the VMM 145 to launch another unikernel in the virtual domain 170 or terminate the virtual domain 170 and resume the full control of the system resources that were previously allocated to the virtual domain 170.

While FIG. 3 illustrates one running unikernel 160, in various other implementations, the unikernel loader 142 may, in similar fashion, launch two or more virtual domains 170, such that each virtual domain would provide an execution environment for a respective unikernel 160.

Running one or more unikernels 160 in respective dedicated virtual domains 170 provides complete isolation of the system resources, since any attempt of a running unikernel to access a system resource outside its virtual domain would cause a VM exit (i.e., execution mode transition from the guest execution mode to the root execution mode), thus transferring the execution control to the VMM 145. On the other hand, despite the possibly increased latency of some operations, the performance of one or more unikernels running in respective dedicated virtual domains would still be as predictable as without the virtualization layer, but with the additional benefit of increased security.

Figure 4:
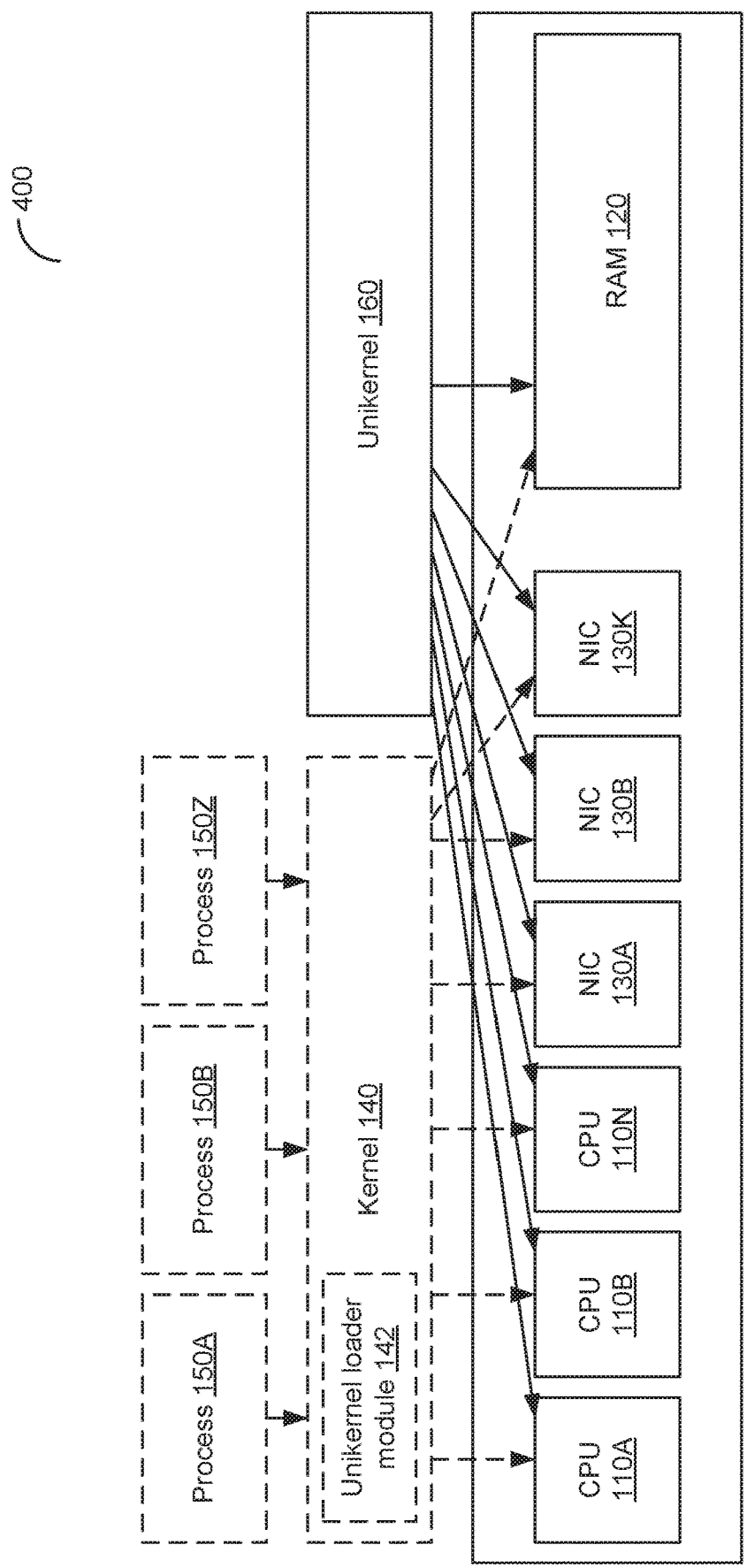
FIG. 4 schematically illustrates another example computing system running a unikernel in the exclusive execution mode, in accordance with one or more aspects of the present disclosure.

In certain implementations, as schematically illustrated by FIG. 4, the computing system 400 may be employed for running the unikernel 160 in exclusive execution mode, in which the unikernel loader 142 may identify a unikernel 160 to be launched, load the identified unikernel binary 160 into the memory 120 and inspect the configuration metadata of the unikernel binary 160. Should the available system resources of the computing system 100 be found sufficient to satisfy the mandatory unikernel system resource requirements specified by the configuration metadata, the unikernel loader 142 may configure various system data structures (such as PCI BIOS tables and/or ACPI tables) for the unikernel to discover the hardware configuration upon startup (i.e., all system resources of the computing system 100, including the processing cores 110A-110N, the RAM 120, and the NICs 130A-130K).

The unikernel loader 142 may then release (as shown by the dotted lines in FIG. 1) all the system resources, and instruct one of the processing cores 110A-110N to execute a jump instruction to the memory address corresponding to the unikernel entry point, thus initiating execution of the unikernel 160. Since the unikernel 160 would be running in the exclusive execution mode, it would take over all system resources of the computing system 100, and would thus run indefinitely or until the computing system 100 is rebooted.

In certain implementations, prior to loading the unikernel, the unikernel loader may inspect the local security policy and/or file permissions to ascertain the user's permissions to run the unikernel. Should the user have insufficient permissions to run the unikernel, the unikernel loader may return a corresponding error code and terminate. The unikernel loader may further inspect the local security policy to ascertain the unikernel's permissions to utilize each of the allocated system resources. Should the unikernel have insufficient permissions to utilize at least some of the resources which are designated as mandatory resourced by the unikernel configuration metadata, the unikernel loader may return a corresponding error code and terminate.

Furthermore, as noted herein above, booting the OS kernel first before launching a unikernel would allow the unikernel omit certain hardware initialization operations that were previously performed by the OS kernel, thus simplifying the unikernel boot process. Furthermore, the unikernel binary does not have to be specified in the boot information (which is often difficult to change), while booting the OS kernel first would allow selecting the unikernel using a variety of interfaces available to a fully functional system, including GUI, APIs, etc.

Figure 5:
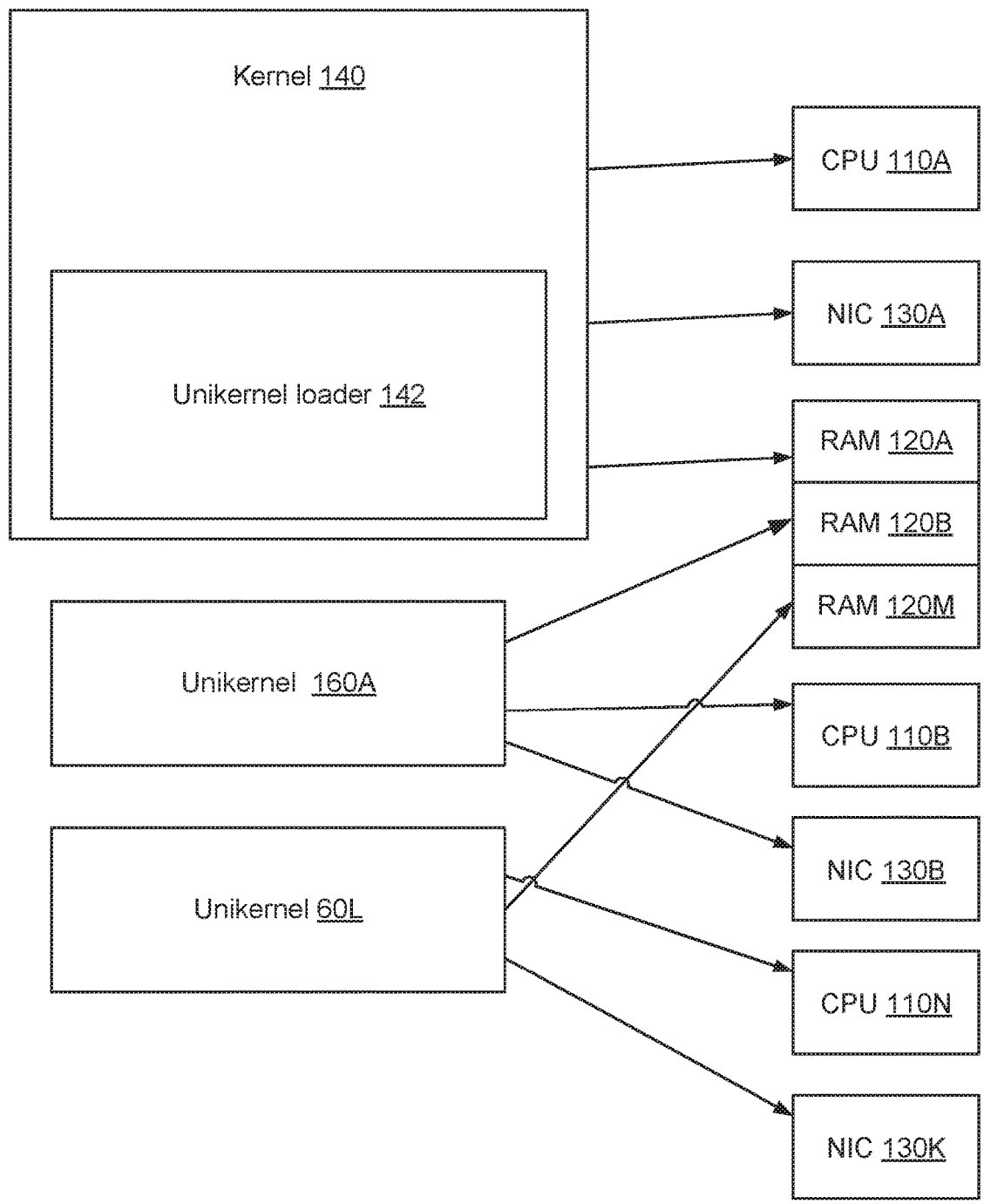
FIG. 5 schematically illustrates another example computing system running two or more unikernels in the non-exclusive execution mode, in accordance with one or more aspects of the present disclosure.

FIG. 5 schematically illustrates an example computing system 500 operating in accordance with one or more aspects of the present disclosure. The computing system 500 may include various system resources including a plurality of processing cores (CPUs) 110A-110N, memory (RAM) 120, and a plurality of NICs 130A-130K. The computing system 500 may further include various system resources, which are omitted from FIG. 5 for clarity and conciseness.

The computing system 500 may run the kernel 140, which may include the unikernel loader 142 for launching and managing one or more unikernels 160A-160L in the exclusive or non-exclusive execution mode, as described in more detail herein above. In the illustrative example of FIG. 5, the kernel 140 retains control over the processing core 110A, NIC 130A, and at least a section of the memory 120. A set of system resources, including the processing core 110B, NIC 130B, and at least a section of the memory 120, is allocated to the unikernel 160A which runs in the non-exclusive mode. Another set of system resources, including the processing core 110N, NIC 130C, and at least a section of the memory 120, is allocated to the unikernel 160L which runs in the non-exclusive mode.

Figure 6:
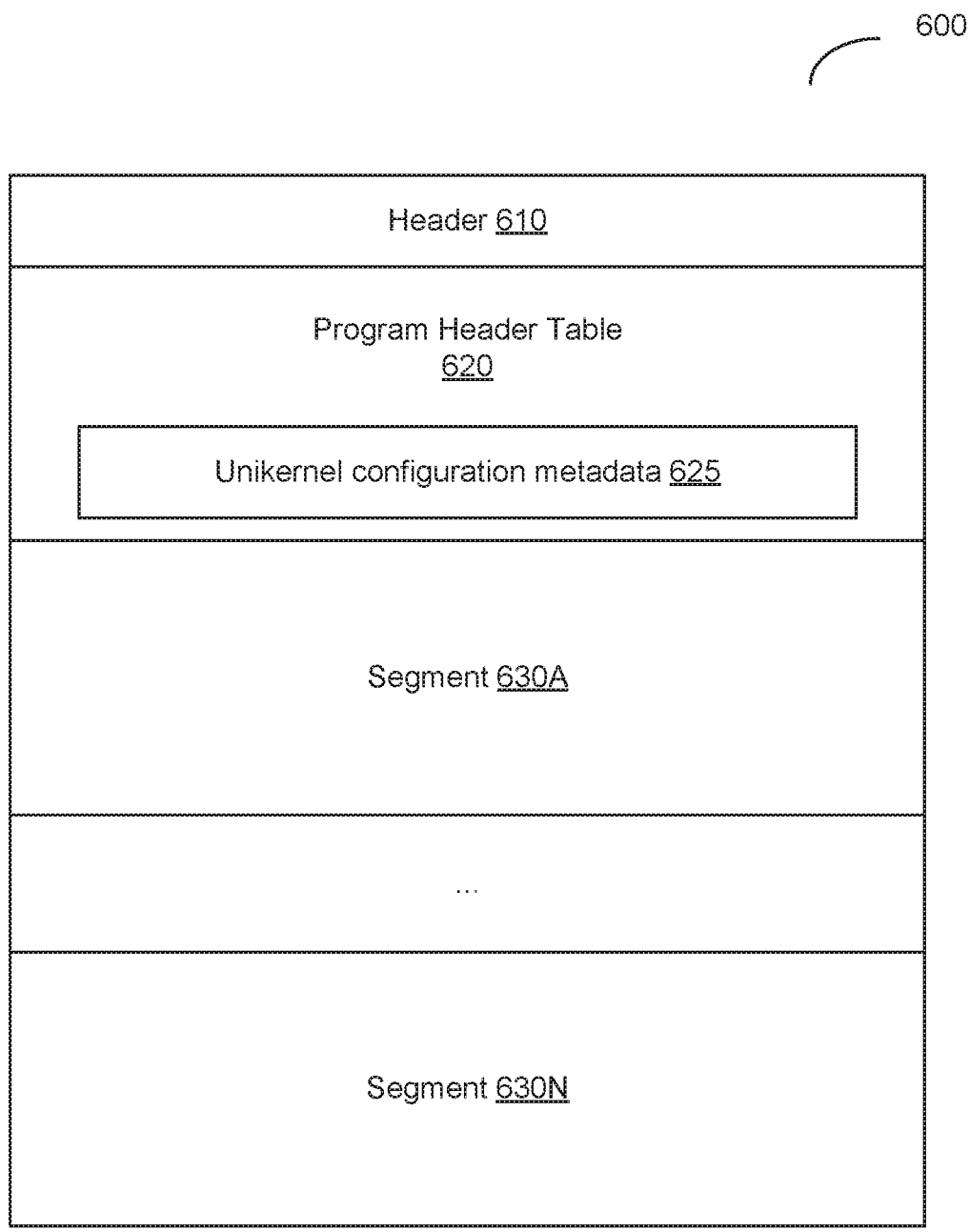
FIG. 6 schematically illustrates an example executable file format which may be utilized by unikernels which are implemented and managed in accordance with one or more aspects of the present disclosure.

FIG. 6 schematically illustrates an example executable file format (e.g., an extension of Executable and Linkable Format (ELF)) which may be utilized to encapsulate unikernels which are implemented and managed in accordance with one or more aspects of the present disclosure. As schematically illustrated by FIG. 6, the executable file format 600 may include the file header 610, the program header table 620, one or more segments 620A-620N, and the optional section header table 640. The file header 610 header resides at the beginning of the file and describes the file's organization. The program header table 620 describes the process image. One or more segments 620A-620N contain the program code and static data.

In accordance with one or more aspects of the present disclosure, the base executable file format may be extended to include unikernel configuration metadata 625 specifying system resources (e.g., the number of processing cores, the amount of memory, the classes of peripherals devices, etc.) required for the unikernel to execute. In an illustrative example, the unikernel configuration metadata 625 may be placed in previously unused sections of the program header table. Alternatively, the program header table 620 may be extended to accommodate for storing the unikernel configuration metadata 625. In an illustrative example, the unikernel configuration metadata may be implemented as an array or a linked list of structures, each structure specifying the resource type and one or more resource type-specific parameters.

The code segments 630A-630N may include one or more code segments executable in the kernel space and optionally may further include one or more code segments executable in the user space. The kernel space and user space code segments would follow the respective application binary interfaces (ABI).

Figure 7:
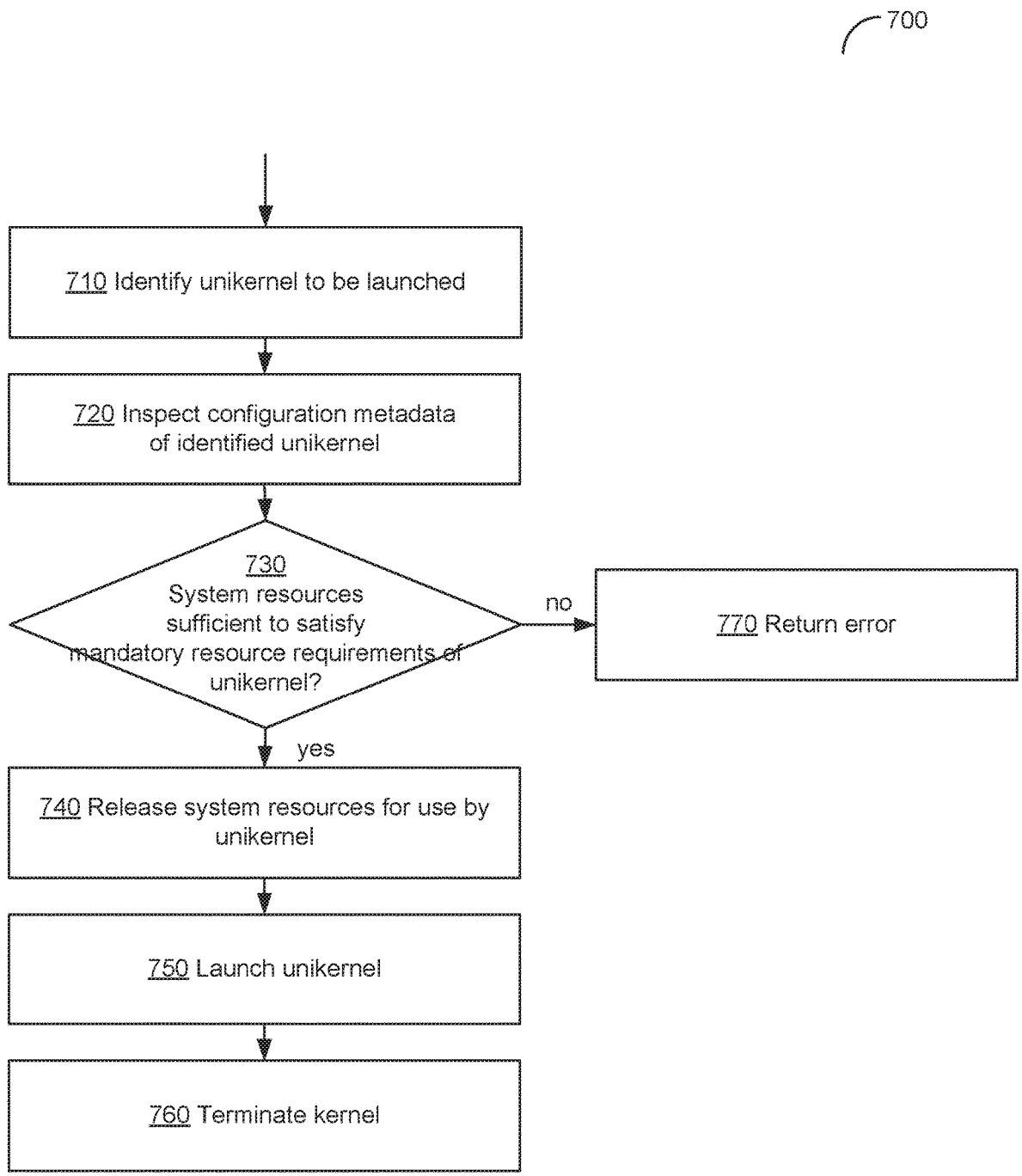
FIG. 7 depicts a flowchart of an example method performed by the kernel for launching a unikernel in the exclusive execution mode, in accordance with one or more aspects of the present disclosure.

FIG. 7 depicts a flowchart of an example method 700 performed by the kernel for launching a unikernel in the exclusive execution mode, in accordance with one or more aspects of the present disclosure. In certain implementations, method 700 may be performed by a single processing thread executed by a processing device. Alternatively, method 700 may be performed by two or more processing threads executed by one or more processing cores, such that each thread would execute one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Therefore, while FIG. 7 and the associated description lists the operations of method 700 in certain order, various implementations of the method may perform at least some of the described operations in parallel and/or in arbitrary selected orders.

At block 710, a kernel running on a processing core of a computing system implementing the method may identify a unikernel binary to be launched in the exclusive mode. The unikernel to be launched and the execution mode may be specified, e.g., via an administrative user interface, via an API exposed by the kernel, via a parameter passed to the kernel by a script executable by the system bootstrap process, or via an initialization parameter passed to the kernel by the system bootstrap process, as described in more detail herein above.

At block 720, the kernel may inspect the unikernel configuration metadata in order to identify the hardware requirements, as described in more detail herein above.

Responsive to determining, at block 730, that the system resources of the computing system satisfy the unikernel system resource requirements specified by the unikernel configuration metadata, the kernel may, at block 740, release the system resources of the computing system for use by the unikernel. Conversely, responsive to determining, at block 730, that the system resources of the computing system fails to satisfy the unikernel system resource requirements specified by the unikernel configuration metadata, the kernel may, at block 770, return a corresponding error code to the unikernel selection interface, and the method may terminate.

At block 750, the kernel may launch the identified unikernel. In certain implementations, prior to launching the unikernel, the unikernel loader may inspect the local security policy and/or file permissions to ascertain the user's permissions to run the unikernel, as described in more detail herein above. Launching the unikernel may involve configuring various system data structures (such as PCI BIOS tables, ACPI tables, etc.) with the description of the set of the system resources for the unikernel to discover the hardware configuration. Launching the unikernel may further involve loading the unikernel binary into the memory and instructing a processing core to execute a jump instruction to the memory address corresponding to the unikernel entry point, thus initiating execution of the unikernel, as described in more detail herein above.

At block 760, the kernel may terminate.

Figure 8:
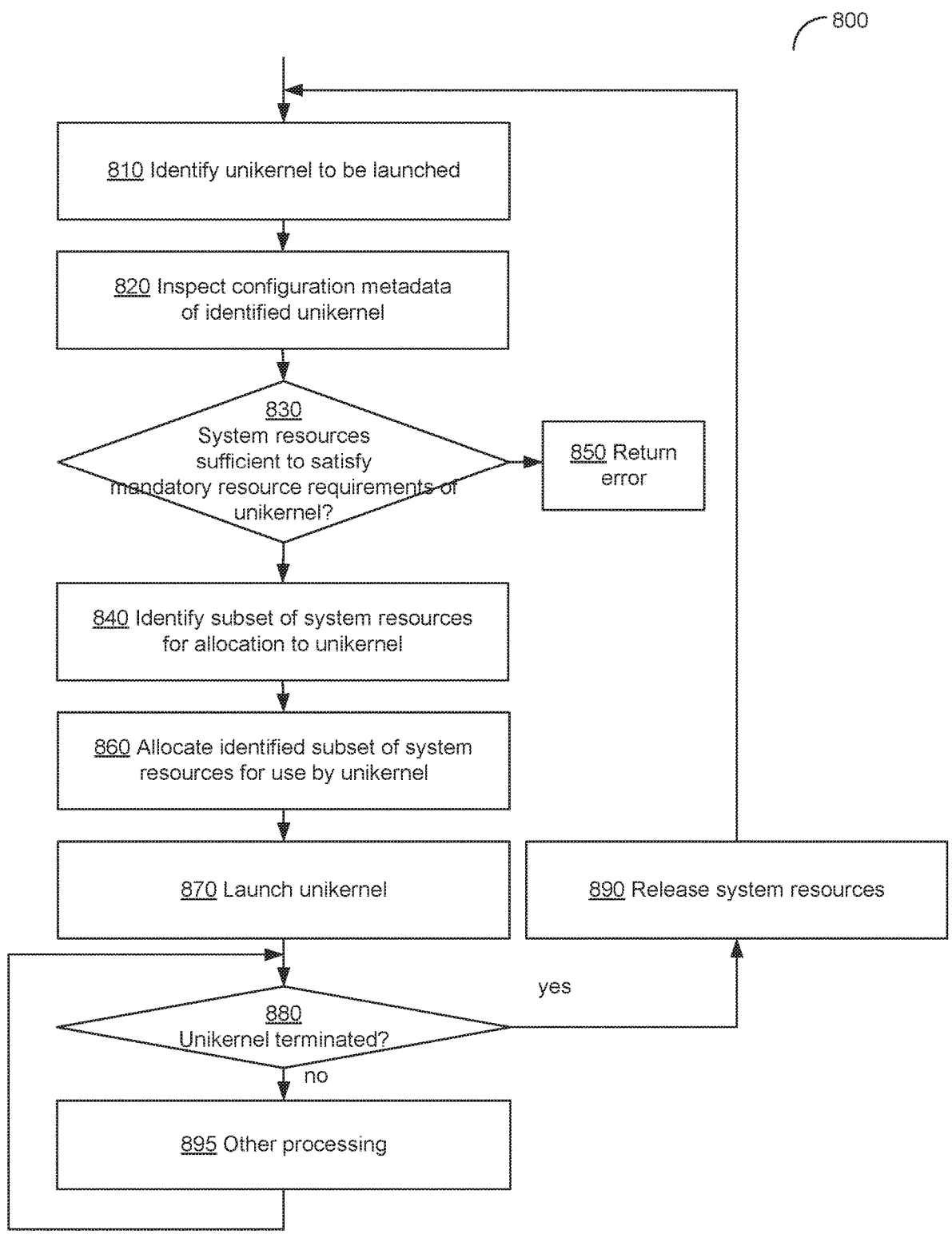
FIG. 8 depicts a flowchart of an example method performed by the kernel for launching one or more unikernels in the non-exclusive execution mode, in accordance with one or more aspects of the present disclosure.

FIG. 8 depicts a flowchart of an example method 800 performed by the kernel for launching one or more unikernels in the non-exclusive execution mode, in accordance with one or more aspects of the present disclosure. Method 800 may be performed by two or more processing threads executed by two or more processing cores, such that each thread would execute one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. Therefore, while FIG. 8 and the associated description lists the operations of method 800 in certain order, various implementations of the method may perform at least some of the described operations in parallel and/or in arbitrary selected orders.

At block 810, a kernel running on a first processing core of a computing system implementing the method may identify a unikernel binary to be launched in the exclusive mode. The unikernel to be launched and the execution mode may be specified, e.g., via an administrative user interface, via an API exposed by the kernel, via a parameter passed to the kernel by a script executable by the system bootstrap process, or via an initialization parameter passed to the kernel by the system bootstrap process, as described in more detail herein above.

At block 820, the kernel may inspect the unikernel configuration metadata in order to identify the hardware requirements, as described in more detail herein above.

Responsive to determining, at block 830, that the system resources of the computing system satisfy the unikernel system resource requirements specified by the unikernel configuration metadata, the kernel may, at block 840, identify a set of system resources of the computing system to be allocated to the identified unikernel. Conversely, responsive to determining, at block 830, that the system resources of the computing system fails to satisfy the unikernel system resource requirements specified by the unikernel configuration metadata, the kernel may, at block 850, return a corresponding error code to the unikernel selection interface, and the method may terminate.

At block 860, the kernel may allocate, for use by the unikernel, the set of system resources associated with a kernel running on the computing system.

At block 870, the kernel may launch the unikernel using a second processing core of the computing system. Alternatively, the unikernel may be launched by the same processing core which has been running the kernel (the latter will thus be terminated by launching the unikernel, as described in more detail herein above with reference to FIG. 7).

Launching the unikernel may involve configuring various system data structures (such as PCI BIOS tables, ACPI tables, etc.) with the description of the set of the system resources for the unikernel to discover the hardware configuration. Launching the unikernel may further involve loading the unikernel binary into the memory and instructing a processing core to execute a jump instruction to the memory address corresponding to the unikernel entry point, thus initiating execution of the unikernel, as described in more detail herein above.

Responsive to detecting, at block 880, that the unikernel has terminated, the kernel may, at block 890, release the system resources that were previously allocated to the unikernel, and the method may loop back to block 810; conversely, should the unikernel not yet have terminated, other processing may be performed by the kernel (block 895), and the method may loop back to block 880.

Figure 9:
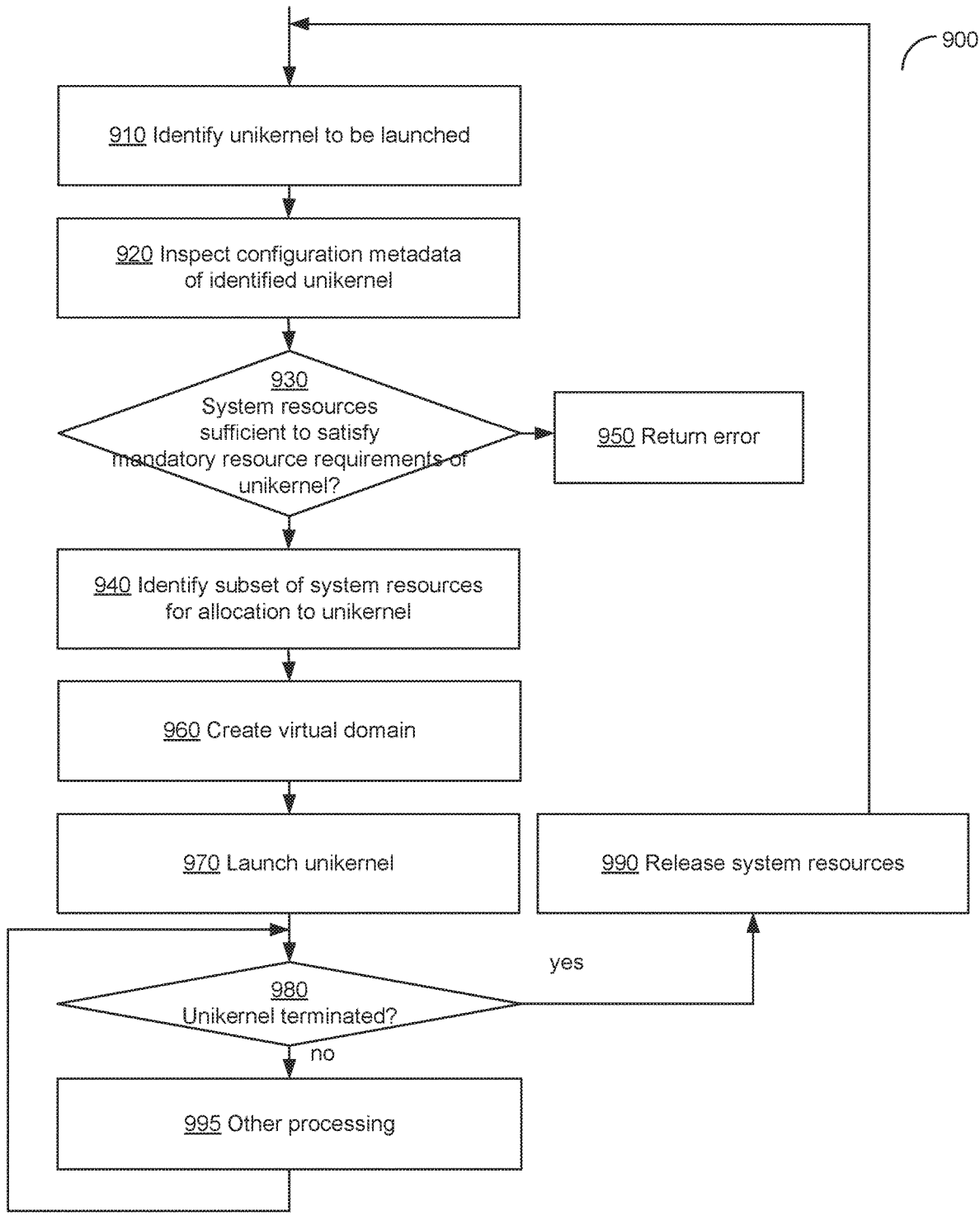
FIG. 9 depicts a flowchart of an example method performed by the kernel for launching one or more unikernels in a virtual domain, in accordance with one or more aspects of the present disclosure.

FIG. 9 depicts a flowchart of an example method performed by the kernel for launching one or more unikernels in a virtual domain, in accordance with one or more aspects of the present disclosure. Method 900 may be performed by two or more processing threads executed by two or more processing cores, such that each thread would execute one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other. Therefore, while FIG. 9 and the associated description lists the operations of method 900 in certain order, various implementations of the method may perform at least some of the described operations in parallel and/or in arbitrary selected orders.

At block 910, a kernel running on a computing system implementing the method may identify a unikernel binary to be launched in the exclusive mode. The unikernel to be launched and the execution mode may be specified, e.g., via an administrative user interface, via an API exposed by the kernel, via a parameter passed to the kernel by a script executable by the system bootstrap process, or via an initialization parameter passed to the kernel by the system bootstrap process, as described in more detail herein above.

At block 920, the kernel may inspect the unikernel configuration metadata in order to identify the hardware requirements, as described in more detail herein above.

Responsive to determining, at block 930, that the system resources of the computing system satisfy the unikernel system resource requirements specified by the unikernel configuration metadata, the kernel may, at block 940, identify a set of system resources of the computing system to be allocated to the identified unikernel. Conversely, responsive to determining, at block 930, that the system resources of the computing system fails to satisfy the unikernel system resource requirements specified by the unikernel configuration metadata, the kernel may, at block 950, return a corresponding error code to the unikernel selection interface, and the method may terminate.

At block 960, the kernel may create a virtual domain for launching the identified unikernel and allocate the identified set of system resources to the virtual domain for exclusive use by the unikernel. In certain implementations, a lightweight virtual domain may be created by initializing only the data structures needed by the processor in order to implement the hardware-assisted virtualization, as described in more details herein above.

At block 970, the kernel may launch the unikernel in the newly created virtual domain. Launching the unikernel may involve configuring various system data structures (such as PCI BIOS tables, ACPI tables, etc.) with the description of the set of the system resources for the unikernel to discover the hardware configuration. Launching the unikernel may further involve loading the unikernel binary into the memory and instructing a processing core to execute a jump instruction to the memory address corresponding to the unikernel entry point, thus initiating execution of the unikernel, as described in more detail herein above.

Responsive to detecting, at block 980, that the unikernel has terminated, the kernel may, at block 990, release the system resources that were previously allocated to the unikernel, and the method may loop back to block 910; conversely, should the unikernel has not yet terminated, other processing may be performed by the kernel (block 995), and the method may loop back to block 980.

Figure 10:
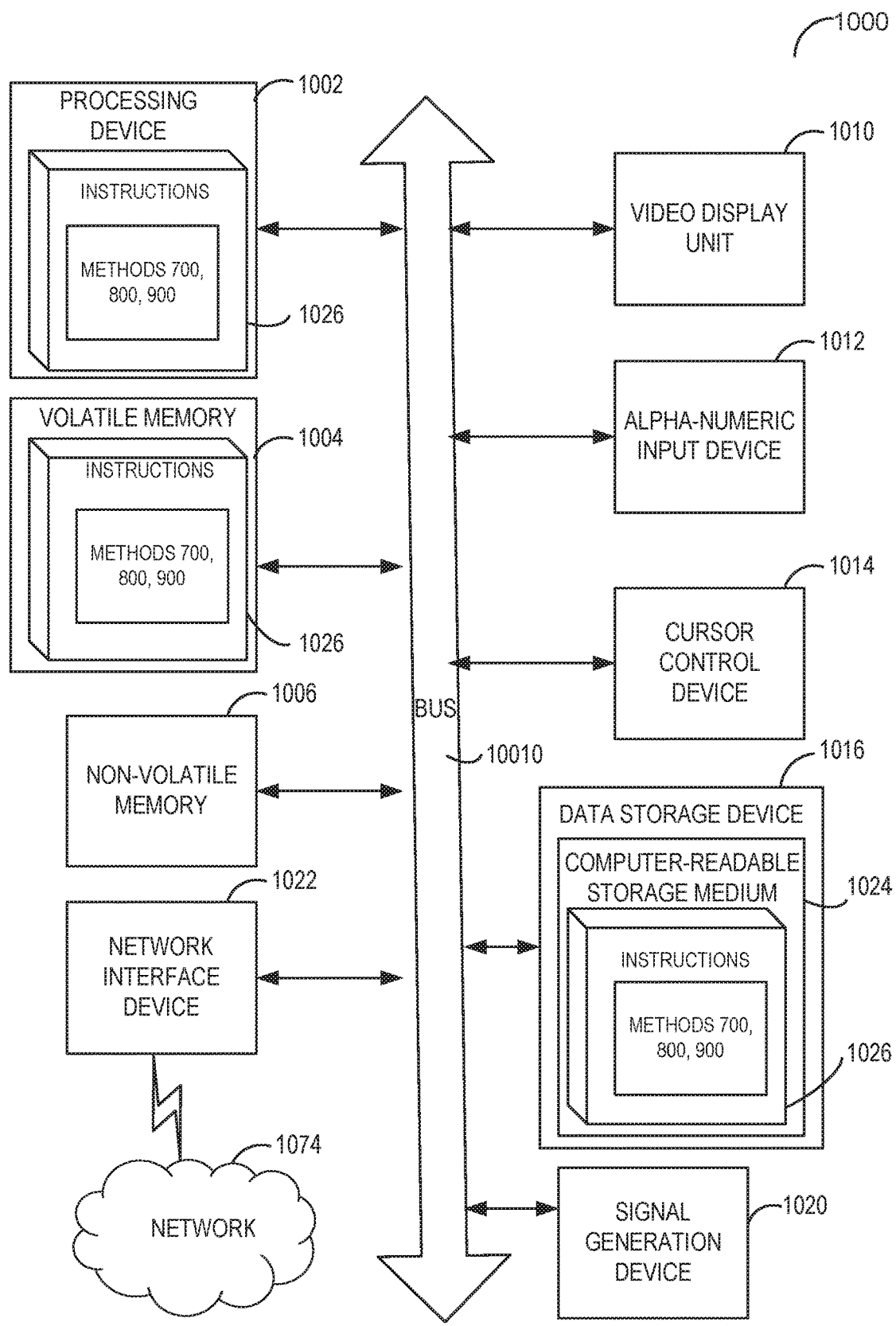
FIG. 10 depicts a block diagram of an illustrative computing device operating in accordance with the examples of the present disclosure.

FIG. 10 depicts a block diagram of a computing system operating in accordance with one or more aspects of the present disclosure. In various illustrative examples, computing system 1000 may correspond to the computing systems 100-500 of FIGS. 1-5. The computing system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer system resources associated with hard disks or other such memory. The VM may emulate a physical computing environment, but requests for a hard disk or memory may be managed by a virtualization layer of a computing device to translate these requests to the underlying physical computing system resources. This type of virtualization results in multiple VMs sharing physical resources.

In certain implementations, computing system 1000 may be connected (e.g., via a network, such as a Local Area Network (LAN), an intranet, an extranet, or the Internet) to other computing systems. Computing system 1000 may operate in the capacity of a server or a client computer in a client-server environment, or as a peer computer in a peer-to-peer or distributed network environment. Computing system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein, including methods 700, 800, and/or 900 for launching one or more unikernels in the exclusive or non-exclusive execution mode.

In a further aspect, the computing system 1000 may include a processing device 1002, a volatile memory 1004 (e.g., random access memory (RAM)), a non-volatile memory 1006 (e.g., read-only memory (ROM) or electrically-erasable programmable ROM (EEPROM)), and a data storage device 1016, which may communicate with each other via a bus 10010.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computing system 1000 may further include a network interface device 1022. Computing system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing 700, 800, and/or 900 for launching one or more unikernels in the exclusive or non-exclusive execution mode. Instructions 1026 may also reside, completely or partially, within volatile memory 1004 and/or within processing device 1002 during execution thereof by computing system 1000, hence, volatile memory 1004, and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within system resources. Further, the methods, components, and features may be implemented in any combination of system resources and computer program components, or in computer programs.

Unless specifically stated otherwise, terms such as "initiating," "transmitting," "receiving," "analyzing," or the like, refer to actions and processes performed or implemented by computing systems that manipulates and transforms data represented as physical (electronic) quantities within the computing system registers and memories into other data similarly represented as physical quantities within the computing system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computing system selectively programmed by a computer program stored in the computing system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computing system designs and configurations may also be suitable to implement the systems and methods described herein. The following examples illustrate various implementations in accordance with one or more aspects of the present disclosure.

Example 1 is a method, comprising: identifying, by a kernel utilizing a set of system resources of a computing system, a unikernel to be launched in an exclusive mode; determining that the set of system resources of the computing system satisfies hardware requirements specified by configuration metadata of the unikernel; releasing, by the kernel, the set of system resources for use by the unikernel; launching the unikernel; and terminating the kernel.

Example 2 is the method of Example 1, wherein the configuration metadata specifies a mandatory requirement for a first system resource and an optional requirement for a second system resource Example 3 is the method of Example 1, wherein launching the unikernel further comprises: determining that the unikernel is associated with one or more permissions to access the set of system resources.

Example 4 is the method of Example 1, wherein launching the unikernel further comprises: modifying a Basic Input/Output System (BIOS) data structure to specify the set of system resources available to the unikernel.

Example 5 is the method of Example 1, wherein launching the unikernel further comprises: loading the unikernel into a memory buffer; and instructing a processing core of the computing system to start execution at a specified address within the memory buffer.

Example 6 is the method of Example 1, wherein the set of system resources comprises at least one of: a processing core, a memory, or a network interface controller.

Example 7 is a non-transitory computer-readable storage medium storing executable instructions that, when executed by a first processing core of the computing system in a kernel mode cause the first processing core to: identify a unikernel to be launched by the computing system; identify, by inspecting configuration metadata of the unikernel, a set of system resources of the computing system for use by the unikernel, wherein the set of system resources comprises a second processing core of the computing system; allocate, for use by the unikernel, the set of system resources; and launch the unikernel using the second processing core.

Example 8 is the non-transitory computer-readable storage medium of Example 7, wherein the set of system resources comprises at least one of: a third processing core, a memory, or a network interface controller.

Example 9 is the non-transitory computer-readable storage medium of Example 7, wherein the configuration metadata specifies a mandatory requirement for a first system resource and an optional requirement for a second system resource.

Example 10 is the non-transitory computer-readable storage medium of Example 7, further comprising executable instructions to cause the first processing core to: identify a second unikernel to be launched on the computing system; identify, by inspecting configuration metadata of the second unikernel, a second set of system resources of the computing system, wherein the second set of system resources comprises a third processing core of the computing system; allocate, for use by the unikernel, the second set of system resources; and launch the second unikernel using the third processing core.

Example 11 is the non-transitory computer-readable storage medium of Example 7, wherein launching the unikernel further comprises: creating a virtual domain for launching the unikernel.

Example 12 is the non-transitory computer-readable storage medium of Example 7, further comprising executable instructions to cause the first processing core to: implement a virtual function associated with a peripheral device of the computing system.

Example 13 is the non-transitory computer-readable storage medium of Example 7, further comprising executable instructions to cause the first processing core to: terminate the unikernel; and launch a second unikernel for execution by the second processing device using the set of system resources.

Example 14 is the non-transitory computer-readable storage medium of Example 7, wherein launching the unikernel further comprises: modifying a Basic Input/Output System (BIOS) data structure to specify the set of system resources available to the unikernel.

Example 15 is the non-transitory computer-readable storage medium of Example 7, wherein launching the unikernel further comprises: determining that the unikernel is associated with one or more permissions to access the set of system resources.

Example 16 is a computing system, comprising: a memory; a first processing core communicatively coupled to the memory, the first processing core configured to: create a virtual domain for launching the unikernel, identify, by inspecting configuration metadata of the unikernel, a set of system resources of the computing system, allocate, to the virtual domain, the set of system resources, launch a unikernel by the virtual domain; and a second processing core communicatively coupled to the memory, the second processing core configured to run the unikernel in the virtual domain using the set of system resources.

Example 17 is the computing system of Example 16, wherein the set of system resources comprises at least one of: a third processing core, a subset of the memory, or a network interface controller.

Example 18 is the computing system of Example 16, wherein the first processing core is further configured to: terminate the unikernel; and launch a second unikernel for execution by the virtual domain.

Example 19 is the computing system of Example 16, wherein launching the unikernel further comprises: modifying a Basic Input/Output System (BIOS) data structure to specify the set of system resources available to the unikernel.

Example 20 is the computing system of Example 16, wherein launching the unikernel further comprises: loading the unikernel into a memory buffer; and instructing the second processing core to start execution at a specified address within the memory buffer.

Example 21 is a method, comprising: creating, by a computing system, a virtual domain for launching the unikernel; identifying, by inspecting configuration metadata of the unikernel, a set of system resources of the computing system; allocating, to the virtual domain, the set of system resources, and launching a unikernel by the virtual domain.

Example 22 is the method of Example 21, wherein the set of system resources comprises at least one of: a third processing core, a subset of the memory, or a network interface controller.

Example 23 is the method of Example 21, wherein launching the unikernel further comprises: modifying a Basic Input/Output System (BIOS) data structure to specify the set of system resources available to the unikernel.

Example 20 is the computing system of Example 16, wherein launching the unikernel further comprises: loading the unikernel into a memory buffer; and instructing the second processing core to start execution at a specified address within the memory buffer.

Example 23 is the method of Example 21, further comprising: terminating the unikernel; and launching a second unikernel for execution by the virtual domain.

Example 24 is the method of Example 21, further comprising: identifying a second unikernel to be launched on the computing system; identifying, by inspecting metadata of the second unikernel, a second set of system resources of the computing system; allocating the second set of system resources to the second virtual domain; and launch the second unikernel using the second virtual domain.

Example 25 is the method of Example 21, further comprising: implementing a virtual function associated with a peripheral device of the computing system.

Example 26 is a method comprising: identifying, by a first processing core of a computing system, a unikernel to be launched; identifying, by inspecting configuration metadata of the unikernel, a set of system resources of the computing system for use by the unikernel, wherein the set of system resources comprises a second processing core of the computing system; allocating, for use by the unikernel, the set of system resources; and launching the unikernel by the second processing core.

Example 27 is the method of Example 26, further comprising: identifying a second unikernel to be launched by the computing system; identifying, by inspecting configuration metadata of the second unikernel, a second set of system resources of the computing system, wherein the second set of system resources comprises a third processing core of the computing system; allocating, for use by the unikernel, the second set of system resources; and launching the second unikernel by the third processing core.

Example 28 is the method of Example 26, further comprising: modifying a Basic Input/Output System (BIOS) data structure to specify the set of system resources available to the unikernel.

Example 29 is the method of Example 26, further comprising: determining that the unikernel is associated with one or more permissions to access the set of system resources.

Example 30 is an apparatus comprising: a means for running a kernel, wherein the kernel identifies a unikernel to be launched in an exclusive mode, determines that a set of system resources of the computing system satisfies hardware requirements specified by configuration metadata of the unikernel, releases the set of system resources for use by the unikernel, launches the unikernel; and a means for running the unikernel binary using the set of system resources.

Example 31 is an apparatus of Example 30, wherein the configuration metadata specifies a mandatory requirement for a first system resource and an optional requirement for a second system resource.

Example 32 is an apparatus of Example 30, wherein launching the unikernel further comprises: determining that the unikernel is associated with one or more permissions to access the set of system resources.

Example 33 is an apparatus of Example 30, wherein launching the unikernel further comprises: modifying a Basic Input/Output System (BIOS) data structure to specify the set of system resources available to the unikernel.

Example 34 is an apparatus of Example 30, wherein launching the unikernel further comprises: loading the unikernel into a memory buffer; and instructing a processing core of the computing system to start execution at a specified address within the memory buffer.

Example 35 is an apparatus of Example 30, wherein the set of system resources comprises at least one of: a processing core, a memory, or a network interface controller.

What is claimed is:

1. A method, comprising:
   identifying, by a kernel utilizing a set of system resources of a computing system, a unikernel to be launched in an exclusive mode;
   determining that the set of system resources satisfies hardware requirements specified by configuration metadata of the unikernel;
   releasing, by the kernel, the set of system resources for use by the unikernel;
   launching the unikernel using the set of system resources; and
   terminating the kernel in response to launching the unikernel.

2. The method of claim 1, wherein the configuration metadata specifies a mandatory requirement for a first system resource and an optional requirement for a second system resource.

3. The method of claim 1, wherein launching the unikernel further comprises:
   determining that the unikernel is associated with one or more permissions to access the set of system resources.

4. The method of claim 1, wherein launching the unikernel further comprises:
   modifying a Basic Input/Output System (BIOS) data structure to specify the set of system resources available to the unikernel.

5. The method of claim 1, wherein launching the unikernel further comprises:
   loading the unikernel into a memory buffer; and
   instructing a processing core of the computing system to start execution at a specified address within the memory buffer.

6. The method of claim 1, wherein the set of system resources comprises at least one of: a processing core, a memory, or a network interface controller.

7. A non-transitory computer-readable storage medium storing executable instructions that, when executed by a first processing core of a computing system in a kernel mode cause the first processing core to:
   identify a unikernel to be launched by the computing system;
   identify, by inspecting configuration metadata of the unikernel, a set of system resources of the computing system for use by the unikernel, wherein the set of system resources comprises a second processing core of the computing system;
   allocate, for use by the unikernel, the set of system resources;
   modify a Basic Input/Output System (BIOS) data structure to specify the set of system resources available to the unikernel; and
   launch the unikernel using the second processing core.

8. The non-transitory computer-readable storage medium of claim 7, wherein the set of system resources comprises at least one of: a third processing core, a memory, or a network interface controller.

9. The non-transitory computer-readable storage medium of claim 7, wherein the configuration metadata specifies a mandatory requirement for a first system resource and an optional requirement for a second system resource.

10. The non-transitory computer-readable storage medium of claim 7, further comprising executable instructions to cause the first processing core to:
   identify a second unikernel to be launched on the computing system;
   identify, by inspecting configuration metadata of the second unikernel, a second set of system resources of the computing system, wherein the second set of system resources comprises a third processing core of the computing system;
   allocate, for use by the unikernel, the second set of system resources; and
   launch the second unikernel using the third processing core.

11. The non-transitory computer-readable storage medium of claim 7, wherein launching the unikernel further comprises:
creating a virtual domain for launching the unikernel.

12. The non-transitory computer-readable storage medium of claim 11, further comprising executable instructions to cause the first processing core to:
implement a virtual function associated with a peripheral device of the computing system.

13. The non-transitory computer-readable storage medium of claim 7, further comprising executable instructions to cause the first processing core to:
terminate the unikernel; and
launch a second unikernel for execution by the second processing core using the set of system resources.

14. The non-transitory computer-readable storage medium of claim 7, wherein launching the unikernel further comprises:
determining that the unikernel is associated with one or more permissions to access the set of system resources.

15. A computing system, comprising:
a memory;
a first processing core communicatively coupled to the memory, the first processing core to:
identify, by inspecting configuration metadata of a unikernel, a set of system resources of the computing system,
allocate, for use by the unikernel, the set of system resources,
modify a Basic Input/Output System (BIOS) data structure to specify the set of system resources available to the unikernel; and
launch the unikernel; and
a second processing core communicatively coupled to the memory, the second processing core to run the unikernel using the set of system resources.

16. The computing system of claim 15, wherein the set of system resources comprises at least one of: a third processing core, a subset of the memory, or a network interface controller.

17. The computing system of claim 15, wherein the first processing core is further to:
terminate the unikernel; and
launch a second unikernel for execution by the second processing core.

18. The computing system of claim 15, wherein launching the unikernel further comprises:
modifying a Basic Input/Output System (BIOS) data structure to specify the set of system resources available to the unikernel.

19. The computing system of claim 15, wherein launching the unikernel further comprises:
loading the unikernel into a memory buffer; and
instructing the second processing core to start execution at a specified address within the memory buffer.

* * * * *